US006785024B1

(12) United States Patent
Corby et al.

(10) Patent No.: US 6,785,024 B1
(45) Date of Patent: Aug. 31, 2004

(54) DIGITAL SCANNER (75) Inventors: Kenneth D. Corby, Rochester, NY (US); John M. Wolski, Lancaster, NY (US); Andrew Sailus, Brockport, NY (US); Dwight J. Petruchik, Honeoye Falls, NY (US); Joseph A. Manico, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 658 days.

(21) Appl. No.: 09/641,103

(22) Filed: Aug. 17, 2000

(51) Int. Cl.⁷ .............................. H04N 1/42; H04N 1/04

(52) U.S. Cl. ...................... 358/474; 358/498; 358/496; 358/482; 271/264; 250/208.1

(58) Field of Search ................................ 358/496, 474, 358/498, 494, 482, 483; 379/361, 367; 250/208.1; 271/264

(56) References Cited

U.S. PATENT DOCUMENTS

| 5,399,850 A | * | 3/1995 | Nagatani et al. .......... 250/208.1 |
| 5,461,492 A | | 10/1995 | Jones .......................... 358/487 |
| 5,644,663 A | * | 7/1997 | Saito et al. .................. 382/313 |
| 5,661,571 A | * | 8/1997 | Ijuin et al. ................... 358/471 |
| 5,751,308 A | | 5/1998 | Gandy et al. ............... 347/338 |
| 5,872,591 A | | 2/1999 | Truc et al. .................... 348/96 |
| 5,943,451 A | | 8/1999 | Lee ............................. 382/313 |
| 5,982,477 A | | 11/1999 | Trafton et al. ................ 358/75 |
| 6,154,294 A | * | 11/2000 | Craig et al. ................. 358/483 |
| 6,178,012 B1 | * | 1/2001 | Larkin et al. ............... 358/474 |
| 6,337,751 B1 | * | 1/2002 | Kimizuka ................... 358/498 |

* cited by examiner

Primary Examiner—Edward Coles
Assistant Examiner—Jason Sherrill
(74) Attorney, Agent, or Firm—Frank Pincelli

(57) ABSTRACT

A digital scanner for scanning sheet document along transport path. The scanner includes a transport mechanism for moving the document along the transport path and a platen. The transport path is designed to minimize sticking or jamming of the document at the platen and for providing a high quality digital scan of the document.

11 Claims, 9 Drawing Sheets

DIGITAL SCANNER

FIELD OF THE INVENTION

The present invention relates to digital scanners, and more particularly, to a digital scanner for scanning relatively stiff hard copy documents along a generally curved transport path.

BACKGROUND OF THE INVENTION

It is known to provided scanners for scanning of hard copy documents. Generally, this takes the form of a flat platen upon which individual documents are placed for scanning. However, this is quite limited and very manual intensive. It is also known to provide automatic feeders on a flatbed scanner whereby a plurality of documents are provided across the platen for scanning of the information thereon. In scanning of relatively stiff documents, such as photographic prints, a number of problems arise. The relatively stiff nature of the photographic print presents several problems with respect to transporting of the documents along a transport path. Another problem associated with photographic prints is the possibility of producing small scratches on the original photographic print. The producing of scratches or other imperfection to the surface of the photographic print can be quite upsetting to the owner as the original print often has sentimental value to the owner. This transporting problem increases when a hard copy photographic print is transported along a curved path. Thus it is important to maintain a photographic print in its best possible condition. Another problem associated with scanning of a relatively stiff hard copy document, is the sticking of the document against the platen which can result in poor image quality and/or potential jamming of the print within the machine. Another problem that may arise in transporting a photographic print along a curved transport path in a scanner is that the leading edge of the photographic print can catch very easily and thus get damaged and/or cause possible jams.

It is important in the scanning of photographic quality images, that the best possible quality image be obtained. If the photographic print is not maintained properly against the scanning platen, various image defects may result. For example, there is a possibility that a magnification shift will occur due to the fact that the print is not always kept at the same distance from the scanning device. Another problem is that the image may have a keystoning effect due to the print not being maintained against the platen during scanning.

Thus, there is a need to provide an automatic scanner for scanning a plurality of relatively stiff documents without damage to the document and maintaining a high degree of quality in the images that are captured.

SUMMARY OF THE INVENTION

In accordance with one aspect of the present invention there is provided a digital scanner for scanning a sheet document comprising:

a transport path along which the documents travel;

a transport mechanism for moving the document along the transport path;

a platen having upper engagement surface, a leading edge and a trailing edge;

a sensor for digitally capturing an image on the document which is transported past the platen;

a first guide surface in the transport path adjacent the leading edge and a second guide surface in the transport path adjacent the trailing edge, the first guide surface and the upper engagement surface forming a first air gap, and the upper engagement surface and the trailing edge forming a second air gap as the document passes the platen.

In accordance with another aspect of the present invention there is provided a digital scanner for scanning sheet documents comprising:

a transport path along which the documents pass;

a transport mechanism for moving the document along the transport path;

a platen having an upper engagement surface, a leading edge and a trailing edge;

a sensor for digitally capturing an image on the documents which are transported past the platen;

a first guide surface in the processing path adjacent the leading edge, the first guide surface being positioned above the leading edge.

In accordance with yet another aspect of the present invention there is provided a digital scanner for scanning sheet documents comprising:

a transport path along which the documents pass;

a transport mechanism for moving the document along the processing path;

a platen having an upper engagement surface, a leading edge and a trailing edge;

a sensor for digitally capturing an image on the documents which are transported past the platen;

a pressure applying member disposed opposite the upper engagement surface for applying a pressure against the document as it moves past the upper engagement surface, the pressure applying member applying a substantially uniform pressure against the document.

In accordance with still another aspect of the present invention there is provided a digital scanner for scanning sheet documents comprising:

a transport path along which the documents pass;

a transport mechanism for moving the document along the processing path;

a platen having a upper engagement surface, a leading edge and a trailing edge;

a sensor for digitally capturing an image on the documents which are transported pass the platen;

the transport path including a first guide surface adjacent said leading edge and a second guide surface adjacent the trailing edge, the first and a first guide surfaces being substantially continuous and smooth.

In accordance with another aspect of the present invention there is provided a digital scanner for scanning a sheet document comprising:

a curved transport path along which the documents travel, the curved transport path comprising a channel having an outer guide surface and an inner guide surface;

a transport mechanism for moving the document along the transport path;

a scan gate located in the inner guide surface, the scan gate comprising an opening in the inner surface;

a sensor for digitally capturing an image on the document which is transported past the scan gate;

a biasing member for maintaining an area of the document to be scanned at the scan gate at a substantially constant distance with respect to the sensor as it passes by the scan gate.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

In the detailed description of the preferred embodiments of the invention presented below, reference is made to the accompanying drawings in which.

DETAILED DESCRIPTION OF THE INVENTION

Figure 1:
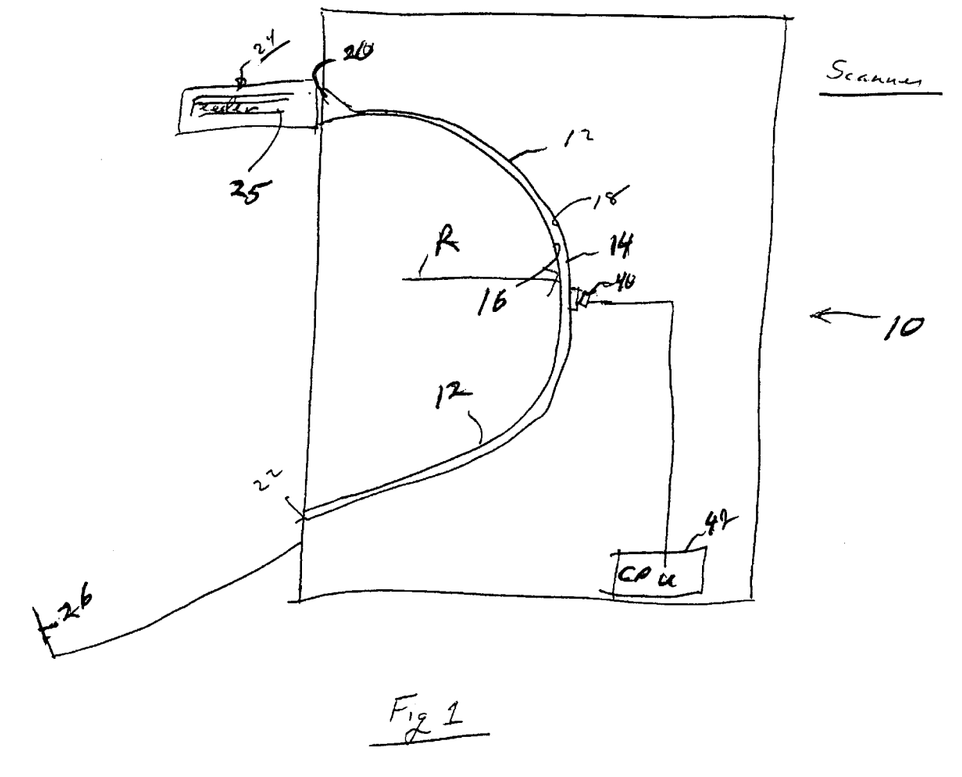
FIG. 1 is a schematic diagram of a scanning apparatus made in accordance with the present invention.
Figure 2:
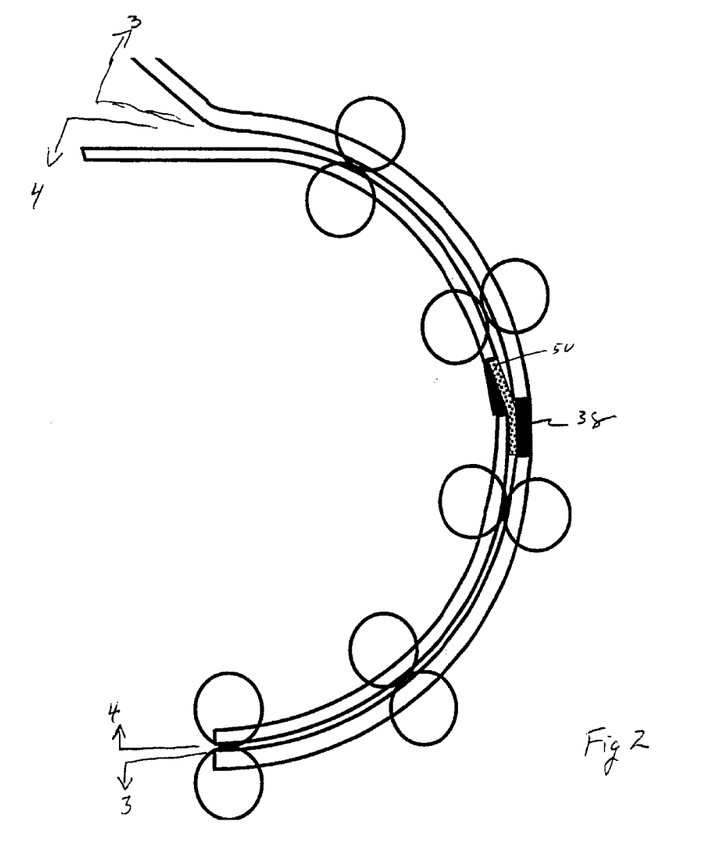
FIG. 2 is an enlarged schematic diagram illustrating the transport path of the scanner of FIG. 1.

Referring to FIGS. 1 and 2, there is illustrated a schematic view of a scanning apparatus 10 made in accordance with the present invention. The apparatus 10 is designed for scanning of documents so as to obtain a digital record thereof. The digital record allows the user to use the captured digital images in any desired manner as is done with such images. The apparatus 10 includes a transport path 12 along which documents are transported. In the particular embodiment illustrated, the transport path 12 comprises a narrow processing channel 14 having an inner guide surface 16 and an outer guide surface 18. The processing channel 14 has an inlet 20 at which documents 25 are fed into the apparatus 10 and at exit 22 from which the documents 25 leave channel 14. An automatic feeding apparatus/mechanism 24 is provided adjacent the inlet for sequentially feeding a plurality of stacked documents into the processing channel 14. In the particular embodiment illustrated the feeding mechanism 24 is designed to feed a plurality of relatively stiff documents such as photographic prints of various sizes. A receiving tray 26 is provided adjacent the outlet for retaining the documents that pass through the scanning apparatus 10. As can be seen, the transport path 12 has a generally curved configuration having a radius of curvature R. It is to be understood that radius of curvature R may be of any appropriate value that still allow the documents 25 to pass along the transport path 12, yet not so severe as to cause damage to the documents 25 due to the curvature. In the particular embodiment illustrated, the radius of curvature R may range from one inch (2.54 cms) to infinity. In the particular embodiment illustrated, the radius of curvature R is about four (4) inches (10.16 cms)

Figure 3:
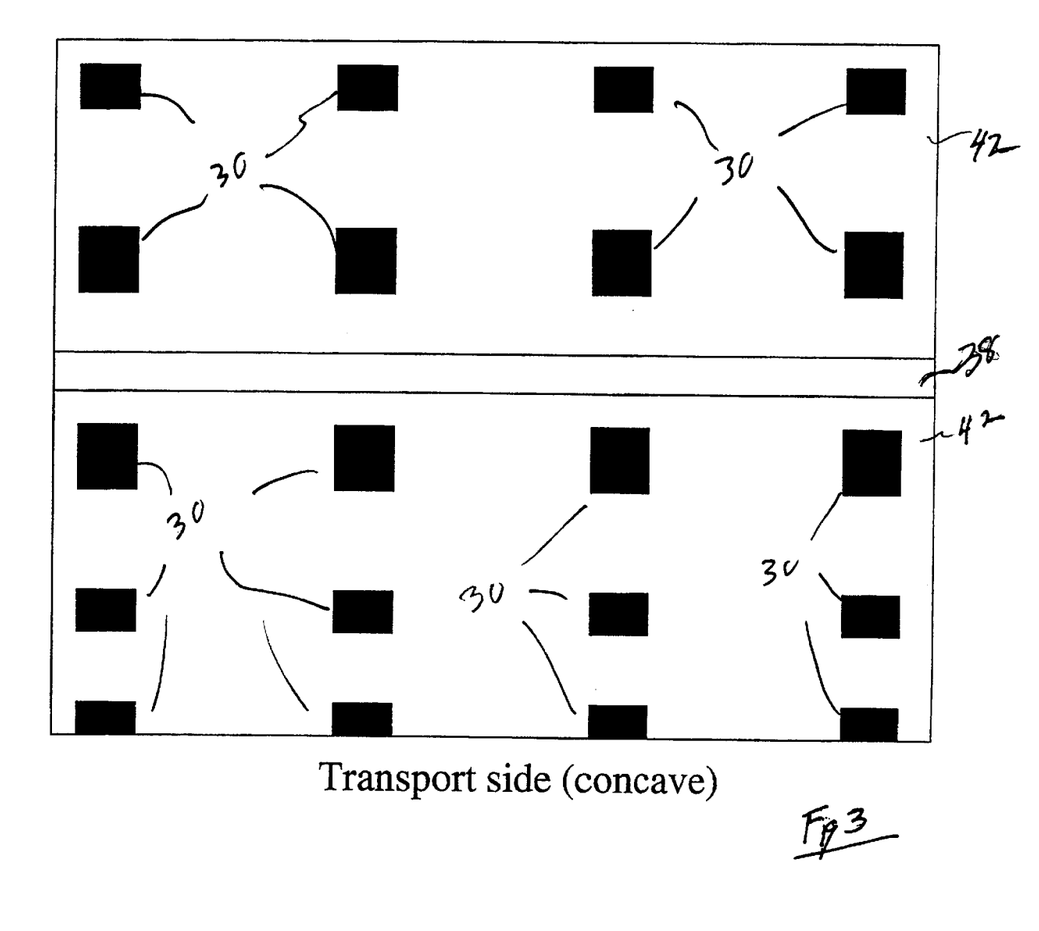
FIG. 3 is an elevational view illustrating one side of the transport path of FIG. 3 as taken along the line 3—3.
Figure 4:
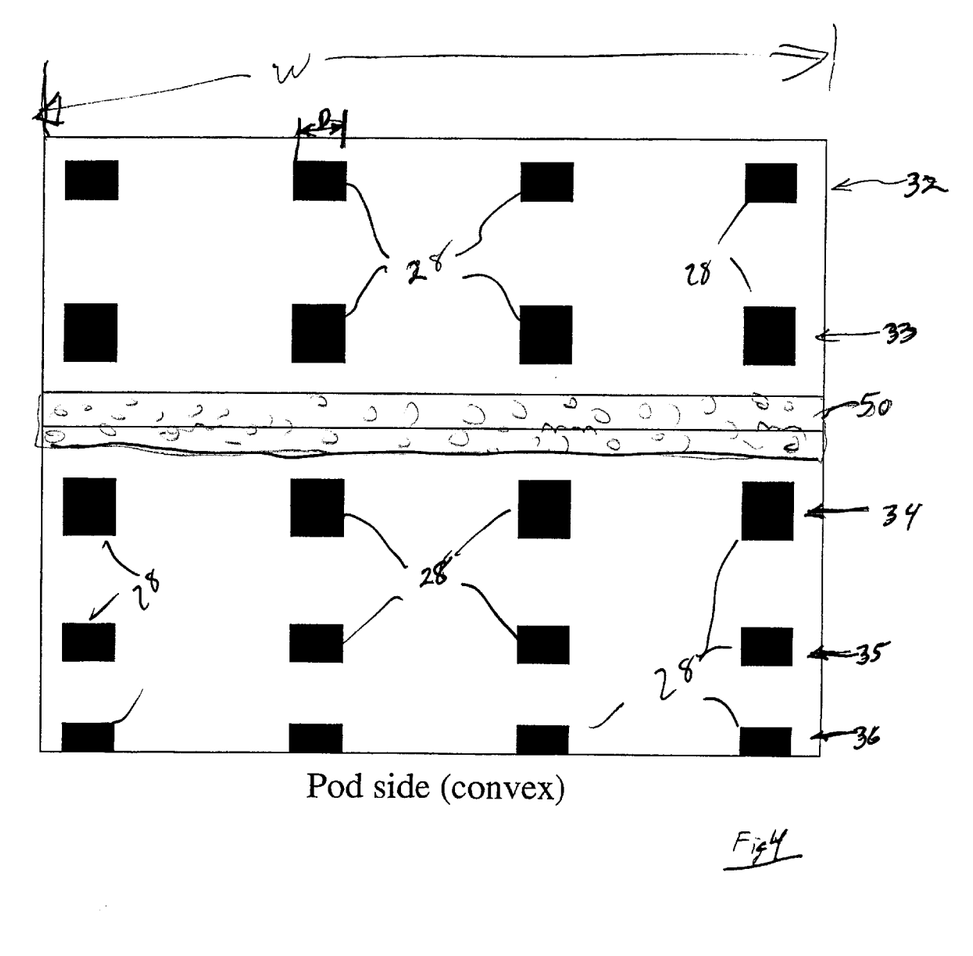
FIG. 4 is a backside elevational view taken along the line 4—4 of FIG. 2.

Referring to FIGS. 3 & 4, there is illustrated a plan view of the inner and outer guide surfaces 16, 18, respectfully of channel 14. A plurality of associated pairs of pinched rollers 28, 30 which extend into channel 14 are provided for transporting of the documents 25 through channel 14. Each associated pair of pinch rollers 28, 30 extend a short distance D along the entire width W of the processing channel 14. The plurality of pairs of pinch rollers 28, 30 are arranged in a plurality of spaced rows 32, 33, 34, 35 and 36. Depending upon the width of the document 25 being passed through channel 14, different pairs or pinch rollers 28, 30 will engage the document 25 for properly moving the document 25 along the transport path 12. A glass platen 38 is located along the processing path 12 against which documents will be passed. A sensor 40 is provided in association with platen 38 for capturing of images on documents 25 as the documents passes by platen 38. In the particular embodiment illustrated, sensor 40 comprises a CCD (charged coupled device) array capable of capturing color images of the documents passing thereby. Sensor 40 includes red, blue and green channels for capturing the three color primary channels such that colored images may be captured. The output of the sensor 40 is passed to a central processing unit 42 which typically takes the form of a computer. The captured digital images may be stored, transmitted and/or manipulated as desired. Typically, the captured digital images would be sent to a device for writing the information on to a storage medium. For example, a CD or computer disk. Alternatively, the data could be sent to an image storage device which could be the computer of the owner of the images, a printer for printing of the image, or simply to a long term storage device or facility whereby the images could be accessed at some later point in time.

Figure 5:
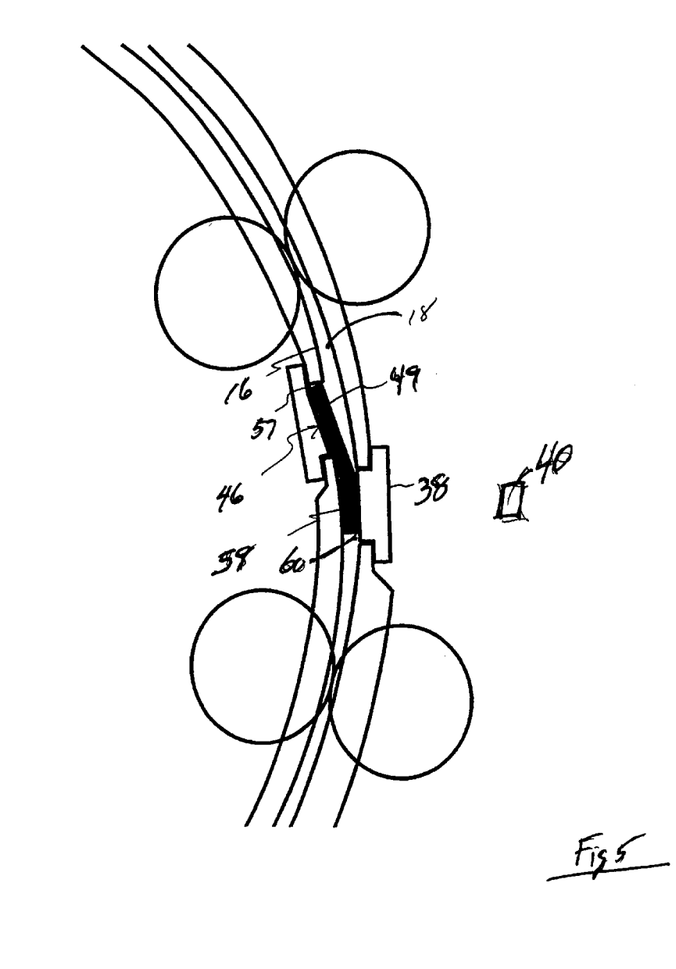
FIG. 5 is an enlarged view of the area of the transport path of FIG. 2 illustrating the platen area where the documents are scanned.
Figure 6:
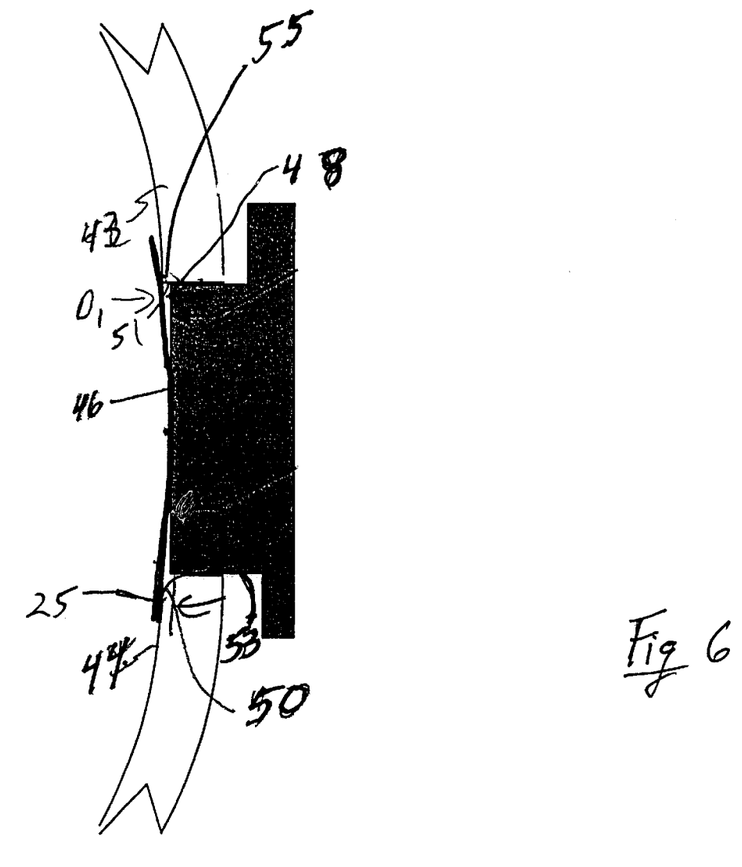
FIG. 6 is an enlarged view of the platen area of FIG. 5 illustrated by lines 6—6.
Figure 7:
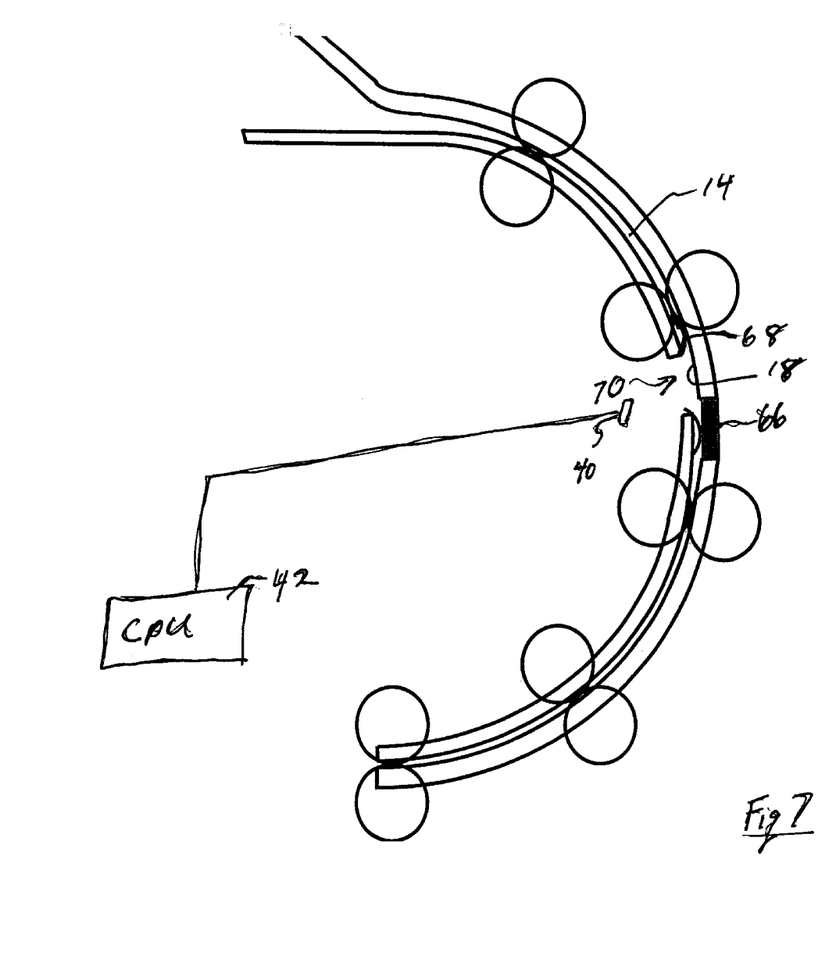
FIG. 7 is a view similar to FIG. 2 illustrating a modified form of the present invention.

Referring to FIGS. 5 and 6 there is illustrated in greater detail the area surrounding the platen 38 where the images on documents 26 are digitally scanned. As can be seen by reference to FIG. 6, the upper engagement surface 46 of platen 38 is positioned slightly below or above the adjacent sidewalls 43, 44 of guide surface 18 of the processing channel 14. Thus, there is formed a small distance D1 between the upper engagement surface 46 of the platen 38 and the surface 18 adjacent side walls 43, 44. This is done so as to provide small air gaps 48, 50 at the leading and trailing edges 51, 53 of the platen 38. This assists in minimizing sticking of the document 25 against platen 38 and also minimizes the possibility of the leading edge of the document from catching on to the leading edge 51 of the platen 38. The end 55 of side wall 43 is positioned such that it abuts edge 51 of platen 38. The side wall 43 which is slightly above the platen 38 whereas the sidewall 44 is slightly above platen 38. Thus, an air gap is formed at both places minimizing sticking the photograph at either of the junctures therebetween.

A biasing member 47 is provided for biasing the document 25 passing thereby against the platen 38. The biasing member 47 in the embodiment illustrated comprises a foam pad having a leading section 49 which is disposed adjacent the inner surface 16 such that the document 25 as it travels thereby will not hit the leading end 57 of the biasing member 47. The foam pad 47 is configured such that trailing section 60 is closely adjacent to platen 38 such that it will cause document 25 to be firmly pressed the platen 38 so as to provide a controlled substantially constant distance with the sensor 40, but not too firmly as to cause a jam. While in the embodiment illustrated, the biasing member is continuous across the width of the document 25, it need not be continuous, but have a configuration so as to apply a substantially uniform pressure across the width of the document 25. FIG. 6 illustrates how a document 25 will be slightly deformed in the area indicated by numeral 64 yet is spaced from the sidewalls 43, 44 as indicated. The biasing member 47 is shaped such that the area 54 is the area in which the sensor scans for obtaining of the digital record of the images on the documents. The inner and outer guide surfaces 16, 18 surrounding the rollers 28, 30 are designed such that they are substantially planar and smooth so that no protrusions are extending therefrom which could possibly scratch the document as it travels therethrough. The surfaces 16, 18 preferably have a kinetic coefficient of friction less than about 0.30, preferably less than about 0.22. In the embodiment illustrated the guide surfaces 16, 18 are made of a Teflon material.

In order to better understand the present invention, a brief description of its operation will now be discussed. First a plurality of documents, for example photographic prints, are placed in feed mechanism 24. The feed mechanism 24 then sequentially feeds the documents into the inlet 20 and are transported along the transport path 12 in channel 14 by pinched rollers 28, 30. The documents as they pass by the platen 38 are biased against the platen 38 such that the document maintains a constant distance from the sensor 40 during scanning. Due to the construction of the sidewalls 43, 44 with respect to the platen 38, the small air gap 48, 50 formed adjacent the platen 38 minimizes potential sticking of the document as it passes thereby. The documents after having been scanned by sensor 40 are transported to the outlet 22 into the receiving tray 26.

Referring to FIGS. 7 and 8a–8c there is illustrated a modified scanner made in accordance with the present invention with like numerals indicating like parts and operation as previously discussed. In this embodiment, a pair of biasing members 66, 68 are placed adjacent on both sides of the scan gate 70 for maintaining the area of the document 25 to be scanned at a substantially constant distance with respect to the sensor 40. In this embodiment, the sensor 40 is provided on the internal guide surface 16 of channel 14. The members 66, 68 maintains the area of the document 25 at a substantially constant distance with respect to sensor 40.

Figure 8A:
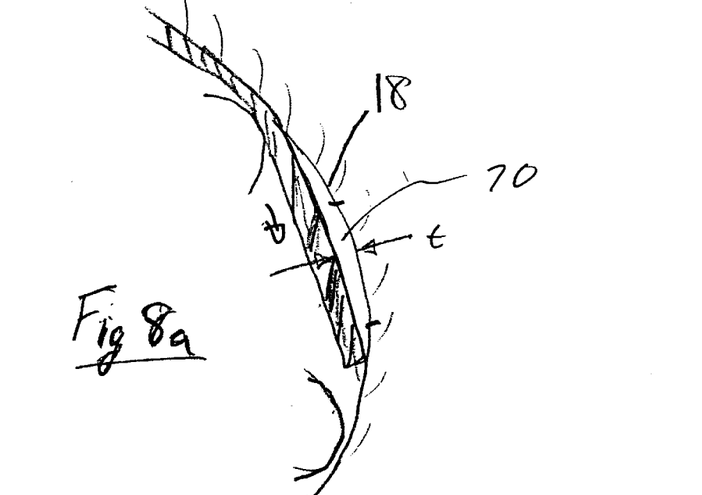
FIGS. 8a–8c are enlarged cross sectional views of the scanning area of the embodiment of FIG. 7 illustrating various stages of a document passing thereby.
Figure 8B:
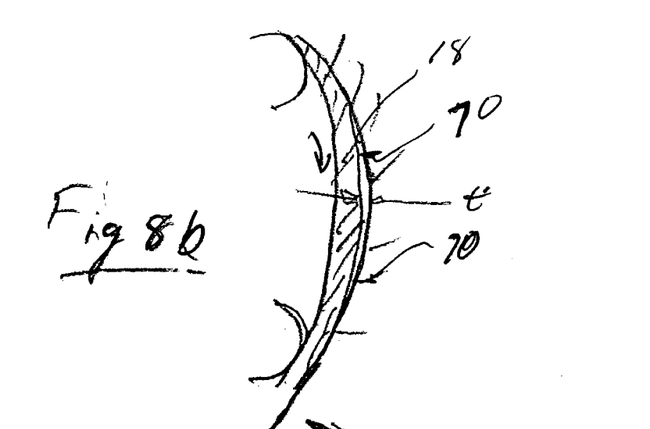
Figure 8C:
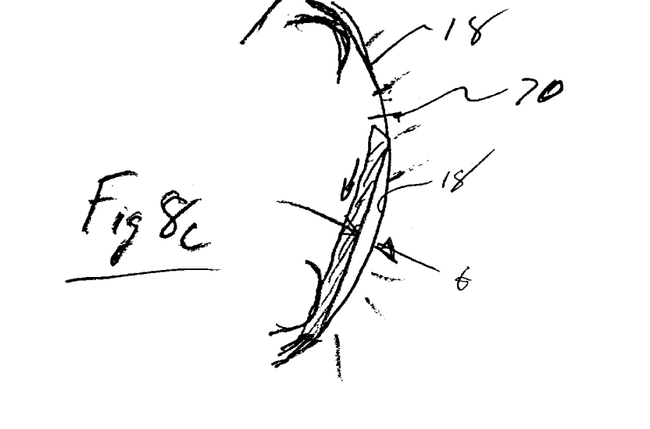
Figure 9:
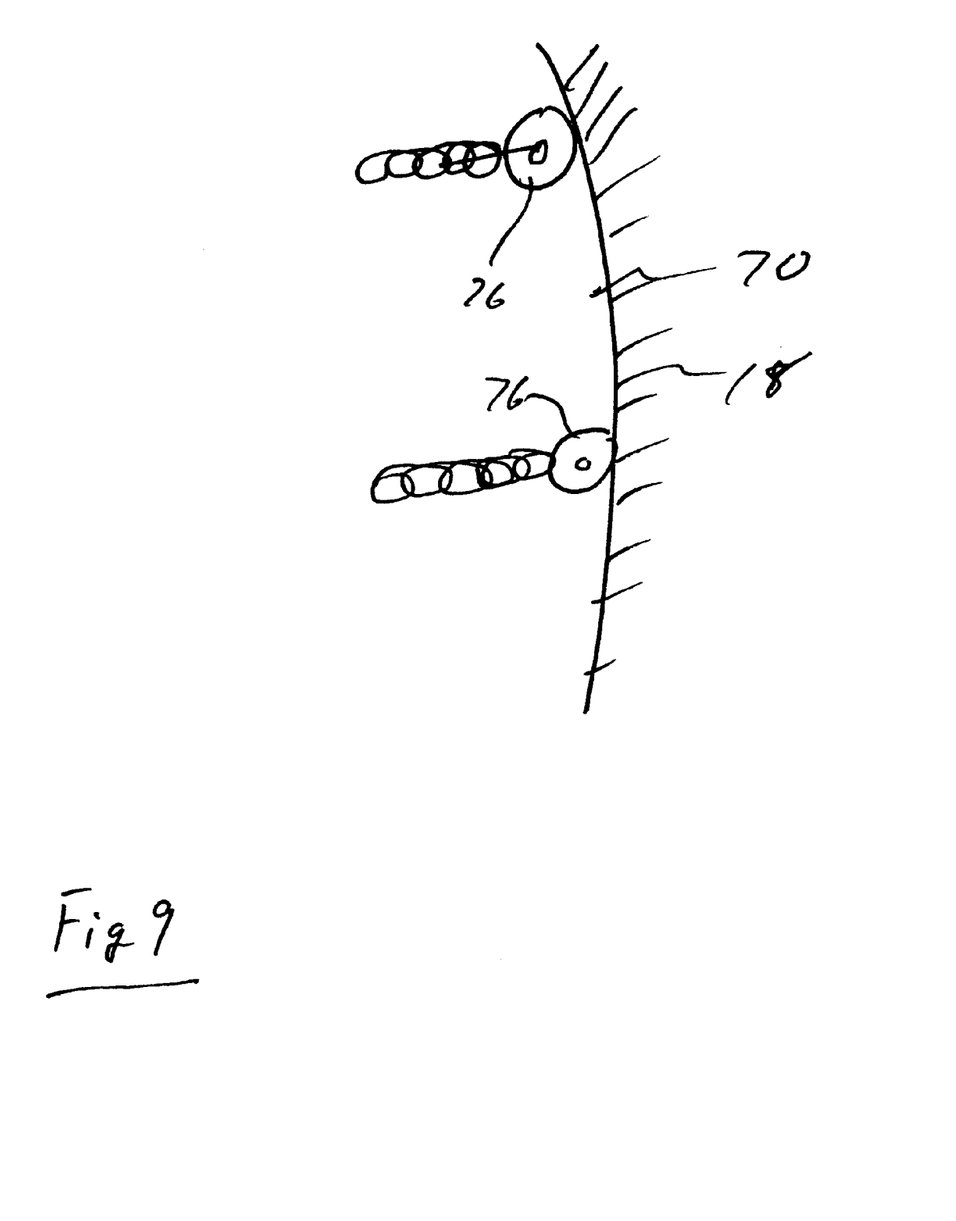
FIG. 9 illustrates an enlarged cross sectional view of the scanning area of a modified device made in accordance with the present invention.

Referring to FIGS. 8a–8c, there is illustrated the position of a document 25 as it travels by scan gate 70. A pair of biasing members 71, 73 are provided, one on the entrance side of the scan gate 70 and one on the exit side of the scan gate 70. The biasing members 71, 73 bias the document against the guide surface 18. Due to the curved configuration of the processing path 12, the leading edge of the document 25 is substantially maintained against the guide surface 18. Due to the stiffness of the document a small distance t results between the document 25 and back wall 18 of the channel. Thus, in this embodiment, the curvature of the processing path 14 assists in maintaining a substantially constant distance between the area of the document 25 being scanned and the sensor 40. In the particular embodiment illustrated, the biasing members 71, 73 comprise a spring like member which apply a biasing force toward surface 18 but is sufficiently low as to allow the document 25 to pass the by without any adverse affect on the document 25. It is to be understood that biasing members 71, 73 may comprise any desired structure. For example, but not by way of limitation, spring mounted rollers 76 could be used to bias the document as shown in FIG. 9.

It is to be understood that various other embodiments may be made without departing from the scope of the present invention. The present invention being defined by the following claims.

Parts List 10. scanning apparatus
12. transport path
14. narrow processing channel
16. inner guide surface
18. outer guide surface
20. inlet
22. exit/outlet
24. automatic feeding apparatus/mechanism
26. receiving tray
28. pinched roller
30. pinched roller
38. glass platen
40. sensor
42. processing unit
43. sidewall section
44. sidewall section
46. engagement surface
47. biasing member/foam pad
48. air gap
49. leading section
50. air gap
51. leading edge
53. trailing edge
54. area
55. end
57. leading end
60. trailing section
64. numeral
66. biasing member
68. biasing member
70. scan gate
71. biasing member
73. biasing member
76. spring mounted rollers

What is claimed is:

1. A digital scanner for scanning a sheet document comprising:

a curved transport path along which said documents travel;

a transport mechanism for moving said document along said transport path;

a platen having upper engagement surface, a leading edge and a trailing edge;

a sensor for digitally capturing an image on said document which is transported past said platen;

a first guide surface in said transport path adjacent said leading edge and a second guide surface in said transport path adjacent said trailing edge, said first guide surface and said upper engagement surface forming a first air gap, and said upper engagement surface and said trailing edge forming a second air gap as said document passes said platen, said first and second guide surfaces having a kinetic coefficient of friction of less than about 0.30; and a pressure applying member capable of applying substantially uniform pressure on said document at said platen along the width of said document.

2. A scanner according to claim 1 where said transport path has a radius of curvature of about four inches (10.16 cms).

3. A scanner according to claim 1 wherein said pressure applying member is substantially continuous across the width of said document.

4. A scanner according to claim 1 wherein said leading guide surface is above said upper engagement surface.

5. A scanner according to claim 1 wherein said trailing guide surface is below said upper engagement surface.

6. A scanner according to claim 1 wherein said document comprises a photographic print.

7. A scanner according to claim 1 wherein said first and second guide surfaces have a kinetic coefficient of friction less than about 0.22.

8. A scanner according to claim 1 wherein said first and second guide surfaces are made of a teflon material.

9. A scanner according to claim 1 wherein said transport mechanism comprises a plurality of pairs of opposed pinch roller.

10. A scanner according to claim 9 wherein said plurality of pairs of pinch roller are arranged in a plurality of rows.

11. A digital scanner for scanning a sheet document comprising:

a curved transport path along which said documents travel, the transportation path has a radius of curvature of about four inches (10.16 cms);

a transport mechanism for moving said document along said transport path;

a platen having upper engagement surface, a leading edge and a trailing edge;

a sensor for digitally capturing an image on said document which is transported past said platen;

a first guide surface in said transport path adjacent said leading edge and a second guide surface in said transport path adjacent said trailing edge, said first guide surface and said upper engagement surface forming a first air gap, and said upper engagement surface and said trailing edge forming a second air gap as said document passes said platen, said first and second guide surfaces having a kinetic coefficient of friction of less than about 0.30; and a pressure applying member capable of applying substantially uniform pressure on said document at said platen along the width of said document.

* * * * *